Aug. 13, 1929.  C. M. MARSH  1,724,673
FRONT WHEEL STEER AND DRIVE UNIT FOR AUTOMOBILES
Filed June 14, 1923   3 Sheets-Sheet 1

Inventor
Clifford Myram Marsh

Aug. 13, 1929.  C. M. MARSH  1,724,673
FRONT WHEEL STEER AND DRIVE UNIT FOR AUTOMOBILES
Filed June 14, 1923  3 Sheets-Sheet 3

Inventor
Clifford Myram Marsh

Patented Aug. 13, 1929.

1,724,673

UNITED STATES PATENT OFFICE.

CLIFFORD MYRAM MARSH, OF GLENS FALLS, NEW YORK.

FRONT WHEEL STEER-AND-DRIVE UNIT FOR AUTOMOBILES.

Application filed June 14, 1923. Serial No. 645,374.

This invention relates to auto vehicles and particularly to vehicles of the front wheel steer and drive type. It proposes the construction of a dirigible driving unit for the forward end of an auto vehicle which is simple in construction, efficient in operation, and which may be applied to any of the existing types of vehicle with but little change in the design or modification in the structure thereof.

One of the objects of the invention is the construction of a front wheel steer and drive unit of the type which is dirigible about a single vertical axis intermediate the wheels, comprising an unsprung axle frame upon which the vehicle wheels may be journalled, and a sprung chassis frame carrying a fifth wheel affording a bearing between the relatively movable chassis and axle frames, said chassis frame also supporting a differential from which the live axle extends to the vehicle wheels, the rotatable part of said fifth wheel having the vehicle springs and differential secured thereto, the steering torque being transmitted to the axle-frame solely by the vehicle springs.

Another object of the invention resides in the provision of a power plant including an engine with the usual speed change gears and controls, and a differential having driving connections between said engine and differential with a fifth wheel intervening, all of said parts being carried by the sprung chassis frame, and an unsprung axle-frame carrying the vehicle wheels, there being a live axle connecting the differential and said axle wheels, having universal joints to allow for vertical vibrations of the vehicle springs, the driving connections between said engine and differential being provided with a flexible coupling above the fifth wheel to compensate for play in the latter member.

Still another object of the invention is to provide a front wheel driving and steering unit in which the driving and steering movements are co-axial, and to provide means for relieving the steering movement of the resistance of the driving torque when said steering movement occurs in a direction opposed to the direction of the drive.

Other objects include the novel braking and steering mechanism presently hereinafter to be described.

With the above and other objects in view, my invention consists in the improved auto vehicle illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1:
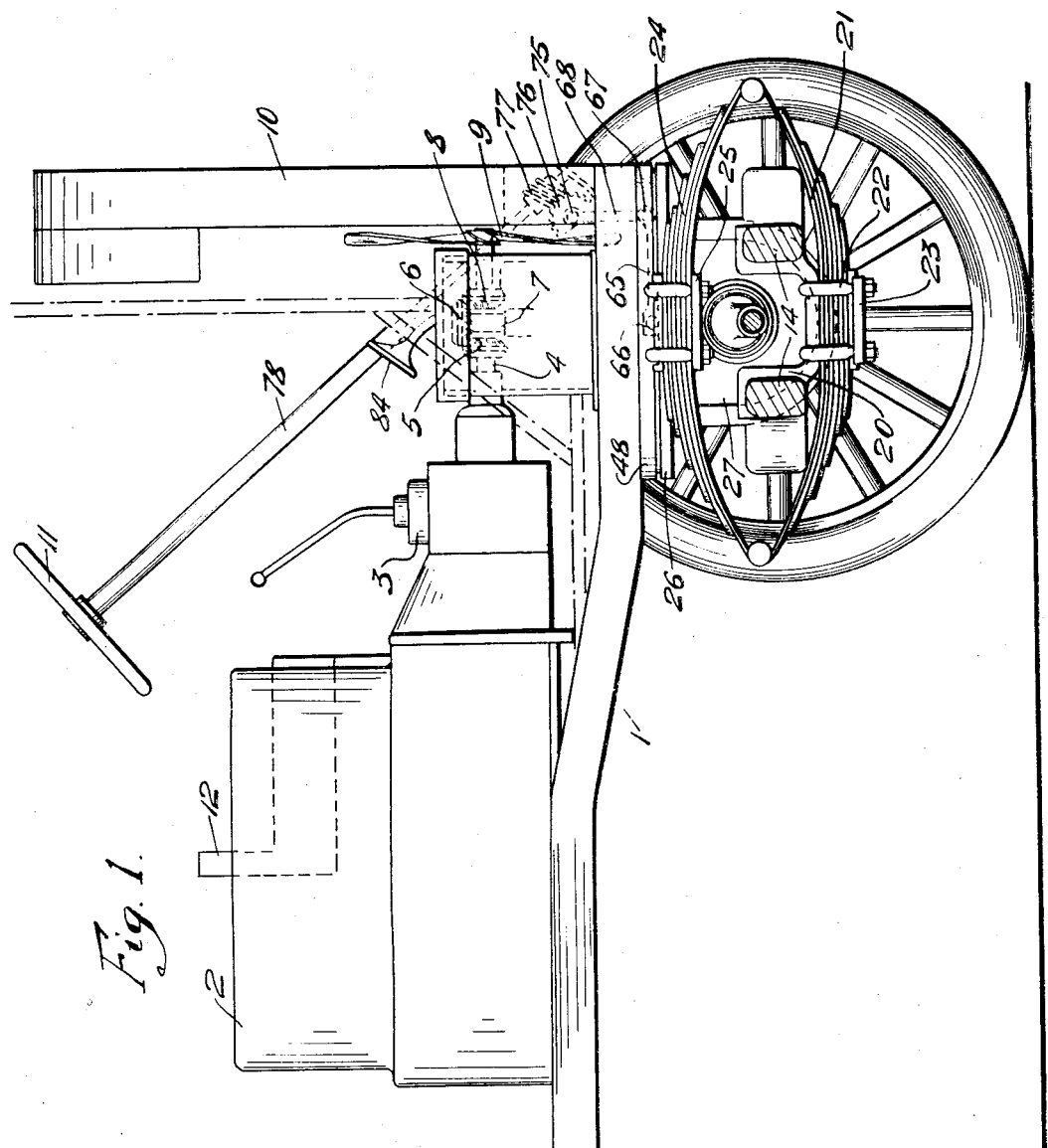
Figure 1 is a side elevation, of the forward part of an auto vehicle equipped with my improved front wheel steer and drive unit, parts being in section taken along the line 1—1 of Figure 3.

Referring now in detail to the several figures, the numeral 1 represents a chassis frame upon which is mounted the internal combustion engine power plant 2 including the gear box 3 and crank shaft 4. The crank shaft is provided with a bevel gear 5 which meshes with a bevel gear 6, the latter being mounted upon the upper end of a vertical shaft 7, and in turn meshing with a bevel gear 8 by means of which the fan 9 is driven, the latter occupying the usual position behind the radiator 10 of the auto vehicle. Steering is accomplished by means of the usual steering wheel 11 and, in the embodiment of the invention which is here disclosed by way of example, the internal combustion engine power plant is located to one side of the chassis frame, the driver's seat 12 being placed on the other side adjacent the engine. None of the structure that has just been enumerated particularly touches the invention except the vertical shaft 7 which forms the driving connection to my improved front wheel steer and drive unit, and therefore such parts, or their arrangement are not considered vital to the invention and may be omitted, altered, or substituted by other parts without in any way impairing the scope or character of the invention.

The front wheel steer and drive unit comprises fundamentally a rigid axle frame 13 (Fig. 2) which in the present instance is shown as constituted by a pair of separated transverse members 14 which come together at the ends forming axle housings for the spindles 15 and 16 to which spindles the vehicle wheels 17 and 18 respectively are keyed. Said wheels are of the usual construction which it does not seem necessary here to describe and bear upon the conical ends of the axle housing through anti-friction roller bearings 19.

Figure 2:
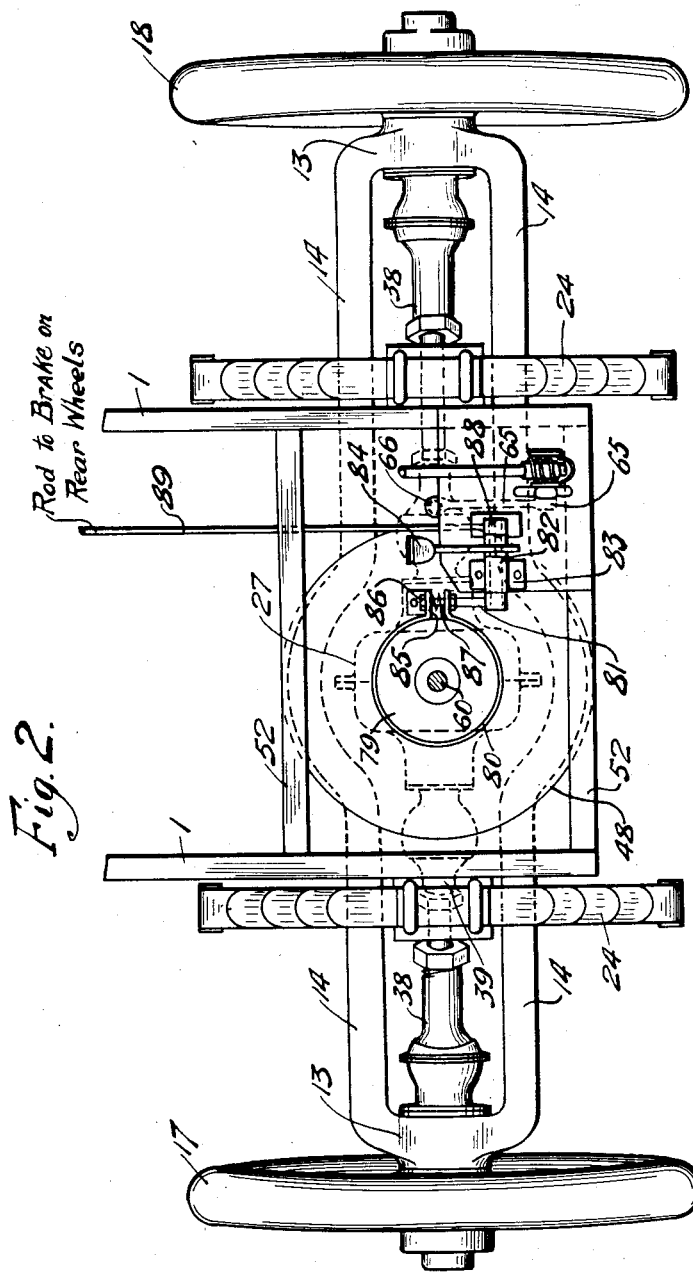
Figure 2 is a plan view of the same, parts being omitted.

Referring particularly to figures 1 and 2, it will be observed that the transverse members 14 of the axle frame are bridged on each side by a bracket 20 which embraces said transverse members and may be secured to them in any suitable manner. Said brackets afford a means for supporting the lower members 21 of the springs which are here shown as being of the full elliptical type. The customary U-bolts 22 and bolt plates 23 are used to secure said spring members to said brackets. The upper members 24 of said springs are secured in a similar manner to the laterally extending lugs 25 which are preferably formed as part of the lower fifth wheel member 26. Said fifth wheel member thus exists in sprung relation with respect to the axle-frame 13.

A differential housing 27 is rigidly fastened to the fifth wheel member 26 and the disposition of the vehicle springs is such that said fifth wheel member and differential are normally held above the median horizontal plane passing through the axle-frame. Within the differential housing is the usual differential mechanism, including the master gear 28 the axle gears 29, of which there are two, one for each side, and the differential pinions 30 the latter being carried by a cage 31 which is secured to, and rotates with the master gear. The axle gears 29 are at the ends of live axles 32 and 33 which pass through apertures 34 in opposite sides of the differential housing and through bores 35 in the axle housing terminating in the spindles 15 and 16. The inner ends of the axles are preferably journalled in appropriate bearings 36 and the outer ends in bearings 37.

Since the nature of the spring support of the fifth wheel member 26 is such as to cause the latter to approach and recede from the axle-frame in response to vertical vibrations of the vehicle springs, provision must be made for alternate shortening and lengthening of the live axles. This is done by providing the universal joints 40 and 41, of which there are two for each axle, one being adjacent the differential housing and the other being adjacent an axle housing, the intermediate portion of each axle floating between the two adjacent universal joints. The universal joints 40 and 41 are preferably enclosed respectively within the dust-proof casings 38 and 39. Said axles are each also provided with telescopic complementary polygonal portions each consisting of a female member 44 and a male member 45, said portions being housed within the casings of the universal joints 38.

An upper fifth wheel member 48 cooperates with the lower fifth wheel member, the latter preferably having an upwardly extending hollow boss 49 and the former being also constructed with an upwardly extending boss 50 surrounding the lower portion of the boss 49 and being journalled thereupon by means of the roller bearings 51. Said upper fifth wheel member is secured to the lower face of the chassis frame, represented by the frame members 52. The upper end of the hollow boss 50 of the upper fifth wheel member may be formed with an inwardly extending flange 53 to afford a seat for the end thrust bearing 54. A retaining plate 55 is screwed or otherwise secured to the upper end of the boss 49 of the lower fifth wheel member for retaining said end thrust bearing and the other parts of the fifth wheel in place. For disassembling the fifth wheel this member must be removed. A pair of circular wear plates 56 and 57 are interposed between the upper and lower fifth wheel members, said wear plates rotating upon ball bearings 58.

The vertical shaft 7, which is connected to the crank shaft of the engine in the manner shown in Figure 1, and previously described, is arranged axially of the hollow boss 49 of the lower fifth wheel member and is connected by means of the coupling 59 with a stub shaft 60, the latter being journalled within said hollow boss by means of the roller bearings 61. A bevel gear 62 fixed to the lower end of said stub shaft meshes with the master gear 28 within the differential housing. It will be understood from the above description that the power plant, fifth wheel, and differential are all secured to the chassis frame and therefore movable rigidly and unitarily together, with the exception that there is necessarily a small amount of play between the upper and lower members of the fifth wheel. To allow for this play the coupling 59 is of the well known flexible type and the joints between the coupling and the shaft 7 as well as the stub shaft 60 are simple slip joints permitting ready separation of the line of drive at said coupling. The bevel gears 5, 6 and 8 and other adjacent associated mechanism may, if desired, be enclosed in the casing 63. In the drawings the casing 63 affords a bearing 64 for the upper end of the shaft 7, but this is only one of many constructions which may be adopted at the pleasure of the vehicle designer.

Figure 3:
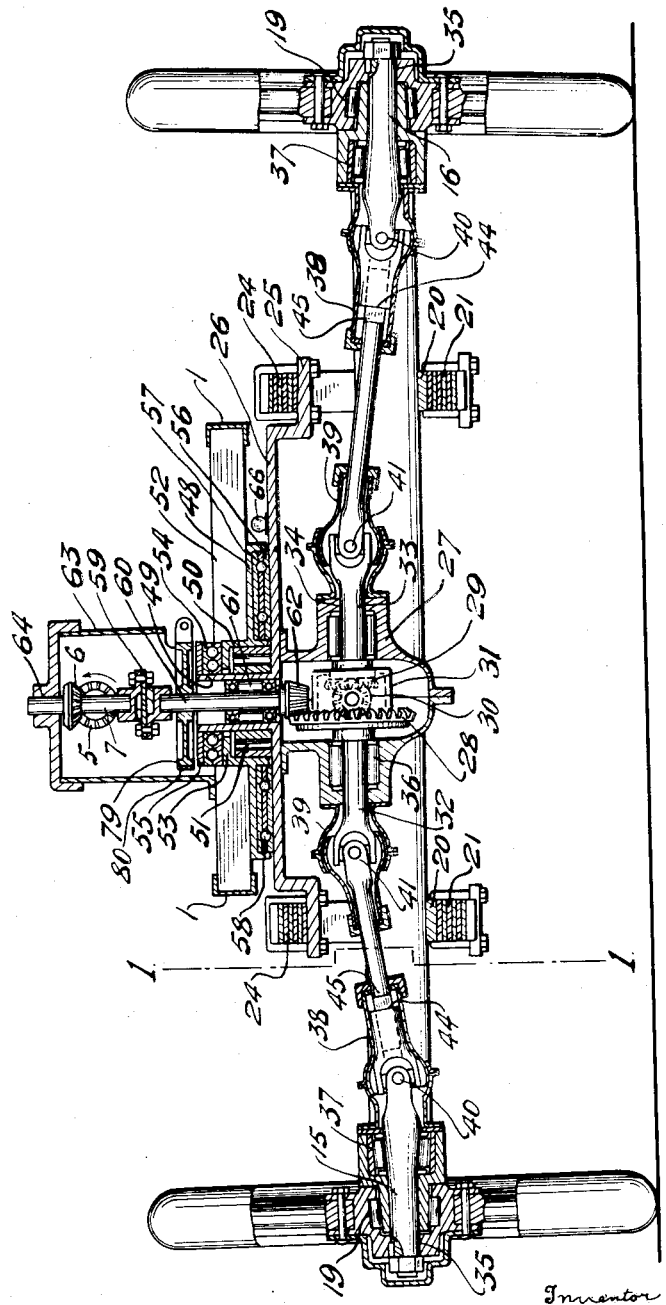
Figure 3 is a front elevation, partly in section.

Steering is accomplished by turning the lower fifth wheel member 26 about the driving axis. The steering torque is transmitted to the axle frame 13 through the vehicle springs. The steering means may be observed in Figures 1 and 2, and consists of a drag link 65 of which the rear socketed end engages a ball 66, secured to the fifth wheel member, as shown in Fig. 3. The forward end of said drag link 65 is pivotally connected at 67 to a steering arm 68 which is rigidly attached to one end of a shaft 75 which carries at its other end a sector 76 which is operated by a worm 77 at the lower end of the steering rod 78. When the steering arm 68 is moved toward the rear of the auto vehicle the lower member of the fifth wheel is, through the ball 66, pulled in the same direction causing an angular movement of the axle-frame and vehicle wheels. When the steering arm 68 is moved in a reverse direction an opposite effect is produced in the steering wheels.

If it be assumed that the crank shaft of the engine rotates in a direction indicated by the arrow in Figure 3, the shaft 7 will rotate clockwisely communicating a clockwise rotation to the driving pinion 62 and a counterclockwise movement to the master gear 28. Normally this counterclockwise movement is, through the differential mechanism, also transmitted to the vehicle wheels, causing progression of the auto vehicle. It has been stated that the steering movement is co-axial with the driving movement, from which it will readily be appreciated that, since the master gear 28 is slightly off-set with respect to the driving and steering axes, it will necessarily rotate about said axis of movement in one direction or the other when steering takes place. Under the assumption that the driving pinion travels in a clockwise direction, a steering movement to the right (as the figure is viewed in the drawings) will cause revolution of the master gear 28 about the driving axis in the direction of rotation of the drive pinion 62 and therefore the steering movement will not conflict with the direction of drive but possibly will be assisted thereby. On the other hand, if the steering unit is rotated toward the left the direction of revolution of the master gear 28 about the axis of drive is contrary to the direction of rotation of the drive pinion 62 and therefore the steering movement will be opposed by the driving torque, introducing a resistance into the steering operation which is quite a material factor in the practical utility of the steering unit.

The means which I have devised for overcoming the interference of the driving torque with the steering movement consists essentially in making one of the live axles somewhat longer than the other in order to produce an action of the differential mechanism, when steering against the driving torque, which will automatically advance the the rotation of the master gear in the direction of drive an amount sufficient to compensate for the revolution of said master gear in the opposite direction about the axis of drive. This is done in the present embodiment of the invention by making the live axle which is opposite the master gear longer than the other live axle. The difference in length is the result of calculation and experiment, but I find that if the live axle 33 be made four inches longer than the live axle 32, approximately perfect results are obtained. The operation of the differential, in avoiding the resistance of the driving torque when steering toward the left, as viewed in Figure 2, is due to the wheels being at unequal distances from the vertical axis of rotation of the steer and drive unit, so that they will travel in concentric arcs of different radii, the radius of the arc traversed by the wheel 18 being the longer, and therefore the rate of rotation of the wheel 18 being greater. This sets up a rotation of the differential pinions 30 about that one of the axle gears 29 which is in the plane of the master gear 28, and therefore causes a counterclockwise movement of the differential cage 31 and the master gear 28 in the same direction in which said master gear is being driven.

In order to mount the chassis frame symmetrically with respect to the vehicle wheels, the lower fifth wheel member extends to the right (Figures 2 and 3) a greater distance than to the left and the vehicle springs are placed symmentrically with respect to the vehicle wheels and not to the driving and steering axis. The chassis frame 52 itself extends more to the right hand side than to the other, which naturally places the internal combustion engine power plant to one side of the central longitudinal line of said chassis frame making sufficient room for the driver's seat 12 at the side of the engine.

The disposition of parts in the preferred embodiment of my invention as above described, lends itself easily to the establishment of a braking system in which a brake drum 79 is secured to the stub-shaft 60. A brake band 80 surrounds this drum and is contracted into gripping relationship with the latter by means of the oscillatory movement in one direction of an arm 81 secured to an operating shaft 82 which is carried in bearings 83 fixed in any suitable manner to the chassis frame. A pedal 84 is operatively associated with the shaft 82. The arm 81 passes through apertures in a pair of adjacent ears 85 formed at the ends of the brake band 80 and is provided with a head or stop 86 by means of which the ears are brought relatively together when the pedal is operated to set the brake. A spring 87 normally holds the ends of the brake band apart in the released position of the brake. An oscillatory arm 88 may be carried by the shaft 82 to which is pivotally attached the link 89 which passes rearwardly into operative relation with the rear wheel brakes of the vehicle, the latter not being shown.

While I have above described what I have found to be a very practical embodiment of my invention, it is nevertheless to be understood that the front wheel steer and drive unit may also be exemplified in numerous other alternative constructions and I accordingly reserve the right to adopt all such legitimate changes as may fairly come within the spirit and scope of the invention as claimed.

Having described my invention what I claim as new and desire to secure by Letters Patent, is:—

1. A wheeled steer and drive unit for autovehicles comprising an axle-frame, a fifth wheel, springs supporting said fifth wheel above said axle-frame, a differential housing secured to said fifth wheel, differential mechanism within said housing, live axles operatively connected to said differential mechanism and supported adjacent their outer ends by said axle-frame, vehicle wheels carried by said live axles, universal joints in said live axles, the latter being provided with telescopic joints intermediate said differential housing and said vehicle wheels through said axle-frame, means for driving said differential, and means for rotating a portion of said fifth wheel co-axially of said driving means, said rotary movement being transmitted to said axle-frame through said springs.

2. A wheeled steer and drive unit for auto vehicles comprising an axle-frame, a fifth wheel comprising upper and lower relatively rotatable members, springs supporting said fifth wheel above said axle-frame, a differential housing secured to said fifth-wheel, differential mechanism within said housing, live axles operatively connected to said differential mechanism and supported adjacent their outer ends by said axle-frame, vehicle wheels carried by said live axles, universal joints in said live axles, the latter being provided with telescopic joints intermediate said differential housing and said axle frame, a prime mover, a drive shaft connecting said prime mover and differential mechanism, means for imparting relative rotation to said fifth wheel members, said rotary movement being transmitted to the axle frame through said springs and a coupling in said drive shaft between said fifth wheel and prime mover.

3. A wheeled steer and drive unit for auto vehicles comprising a differential, a pair of live axles operatively connected to said differential, vehicle wheels carried by said live axles at their outer ends, driving means for said differential, means for steering said vehicle wheels co-axially of said driving means, said vehicle wheels being at different distances from the axis of said driving means, to cause operation of said differential mechanism in steering in such direction as to counteract the resistance of the driving torque to said steering movement.

4. A wheeled steer and drive unit for auto vehicles comprising differential mechanism including a master gear, live axles operatively connected to said differential mechanism, vehicle wheels carried at the outer ends of said live axles, a drive gear meshing with said master gear, means for steering said vehicle wheels co-axially of said drive gear, that one of said vehicle wheels which lies opposite said master gear being at a greater distance from the axis of said drive gear than the other.

5. A wheeled steer and drive unit for auto vehicles comprising a pair of live axles, vehicle wheels driven by said axles, a drive shaft, and means for driving said live axles from said drive shaft, said axle driving means being rotatable relatively to said drive shaft coaxially with the drive shaft in the steering movement of said vehicle wheels, one of said vehicle wheels being at a greater distance from the axis of said drive shaft than the other to counteract the resistance of said axle driving means to the driving torque of said drive shaft when said axle driving means is rotated relatively to said drive shaft in a direction counter to the direction of rotation of said drive shaft during the steering movement of said wheels.

6. In an auto vehicle, a wheeled steer and drive unit comprising a drive shaft rotatable on an axis at one side of the longitudinal center of the chassis of the vehicle, a differential including a master gear rotatable in a plane on the same side of the longitudinal center of the chassis of the vehicle as said drive shaft and driven by said drive shaft, a pair of live axles operatively connected to said differential, vehicle wheels carried at the outer ends of said axles, and means for steering said vehicle wheels coaxially of said driving means, one of said vehicle wheels being at a greater distance from the axis of said drive shaft than the other wheel to cause rotation of said master gear in the direction of rotation of said drive shaft through an angular distance sufficient to compensate for the revolution of said master gear about said drive shaft in a direction contrary to that of said drive shaft when the vehicle wheels are steered in said contrary direction.

7. A wheeled steer and drive unit for auto vehicles comprising an axle-frame, a fifth wheel including upper and lower relatively rotatable members, springs supporting said fifth wheel upon said axle-frame, a differential secured to said lower fifth wheel member, live axles operatively connected to said differential and supported at their ends by said axle-frame, a master gear for driving said axles through said differential, vehicle wheels carried by the outer ends of said live axles, a drive shaft for said master gear and differential passing through said fifth wheel, one of said vehicle wheels being at a greater distance from the axis of said drive shaft than the other wheel, means for steering said vehicle wheels coaxially of said drive shaft, and a brake element acting upon said axles through said drive shaft.

In testimony whereof I have hereunto set my hand.

CLIFFORD MYRAM MARSH.